March 13, 1962 — G. EVEN — 3,024,704
ARMOURED TANK
Filed May 13, 1957 — 7 Sheets-Sheet 1

Inventor
G. Even

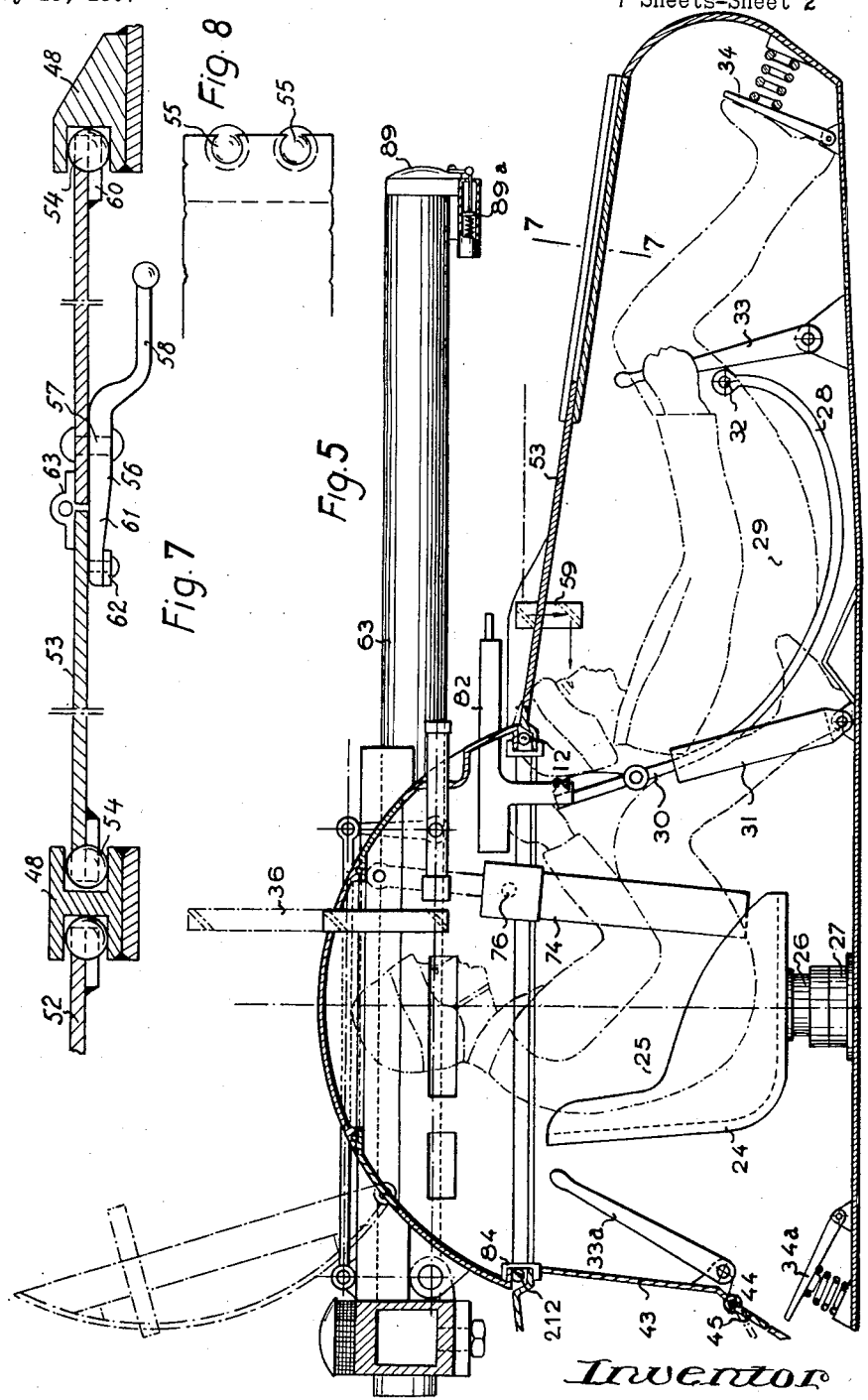

March 13, 1962 G. EVEN 3,024,704
ARMOURED TANK
Filed May 13, 1957 7 Sheets-Sheet 3
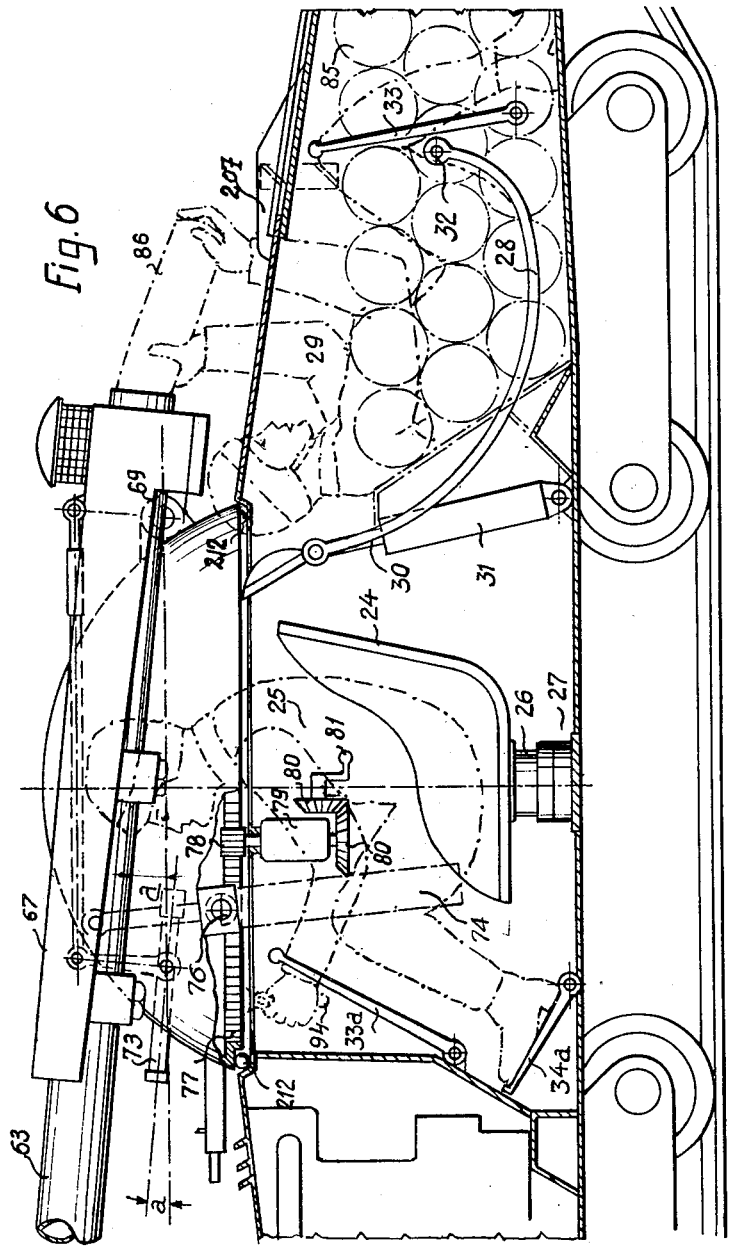
Inventor
G. Even
By Glascott Downing Seebold
Attys

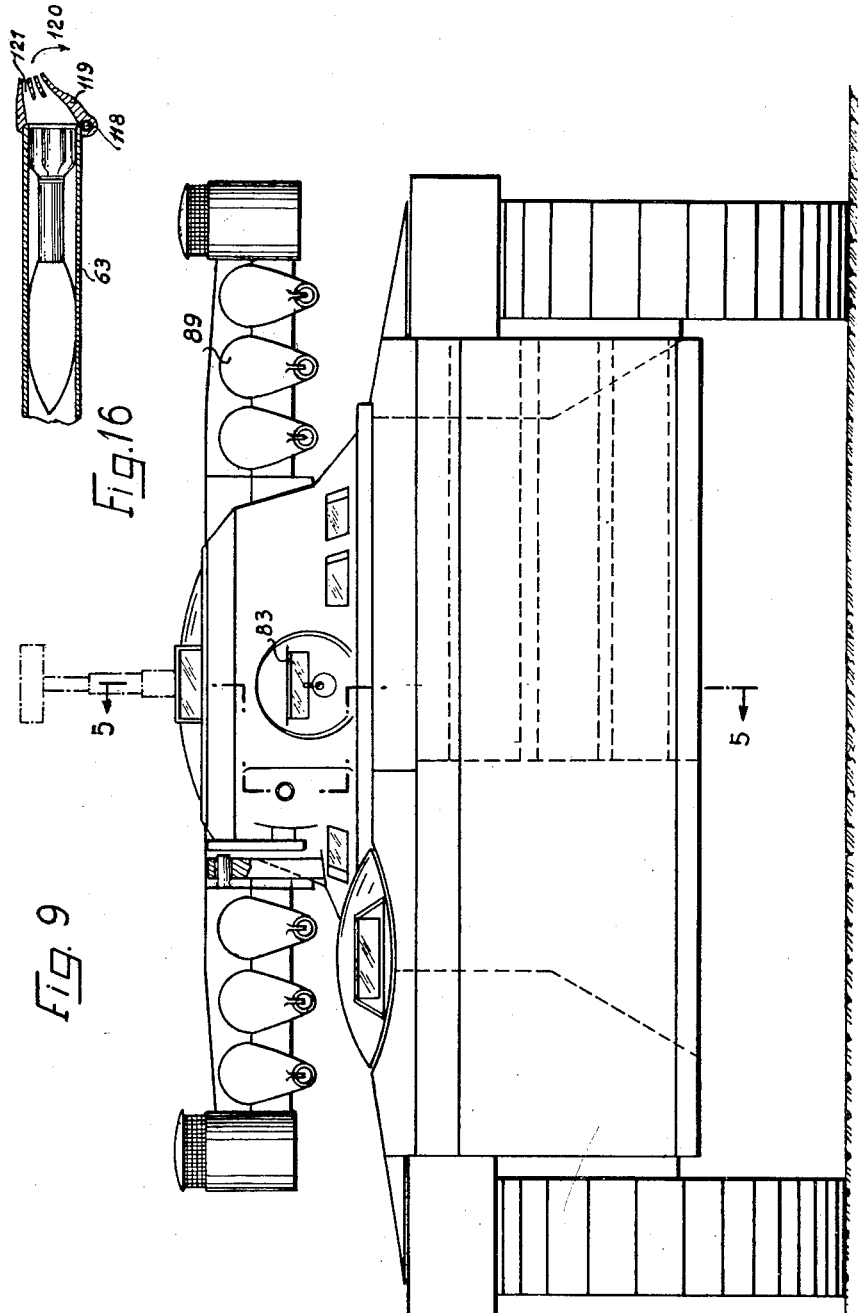

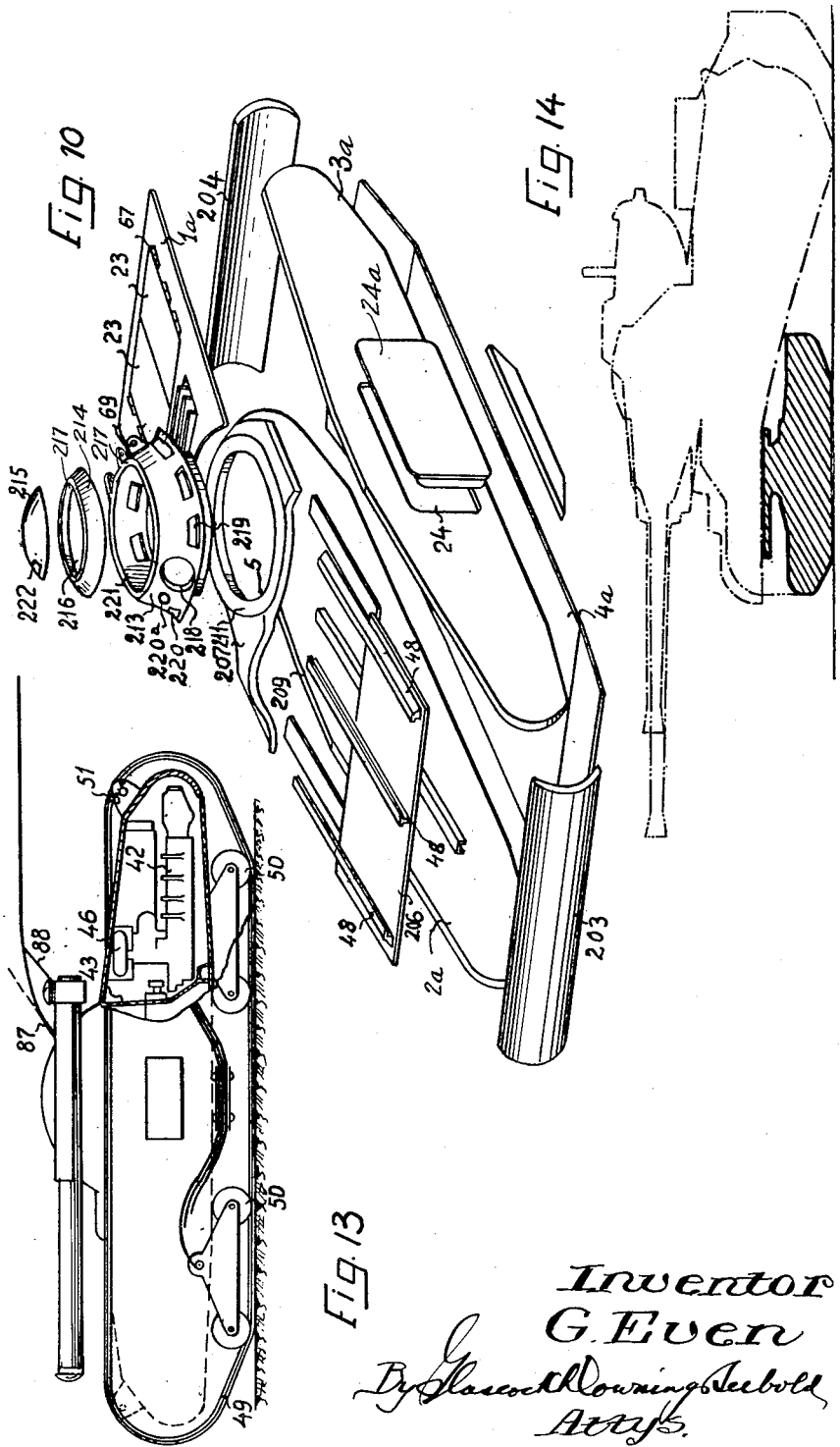

March 13, 1962 G. EVEN 3,024,704
ARMOURED TANK
Filed May 13, 1957 7 Sheets-Sheet 6
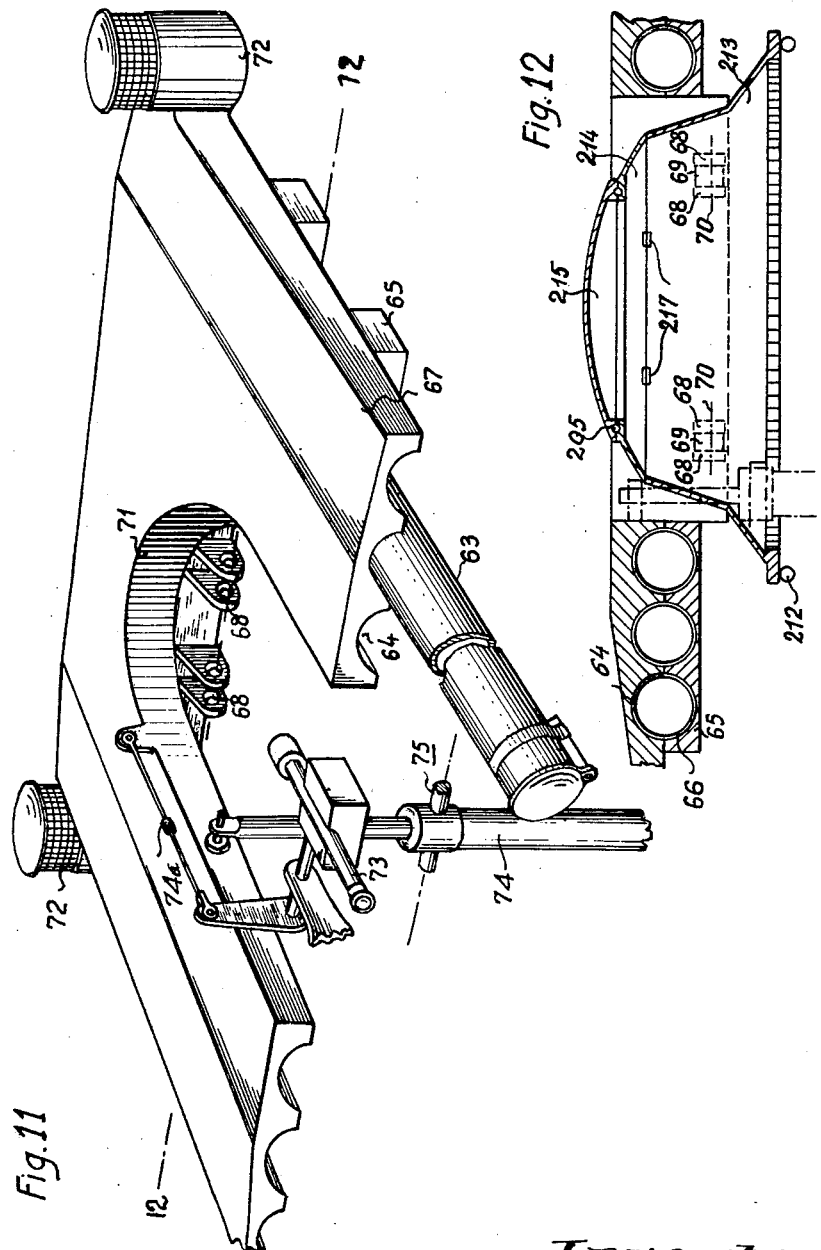
Inventor
G. Even

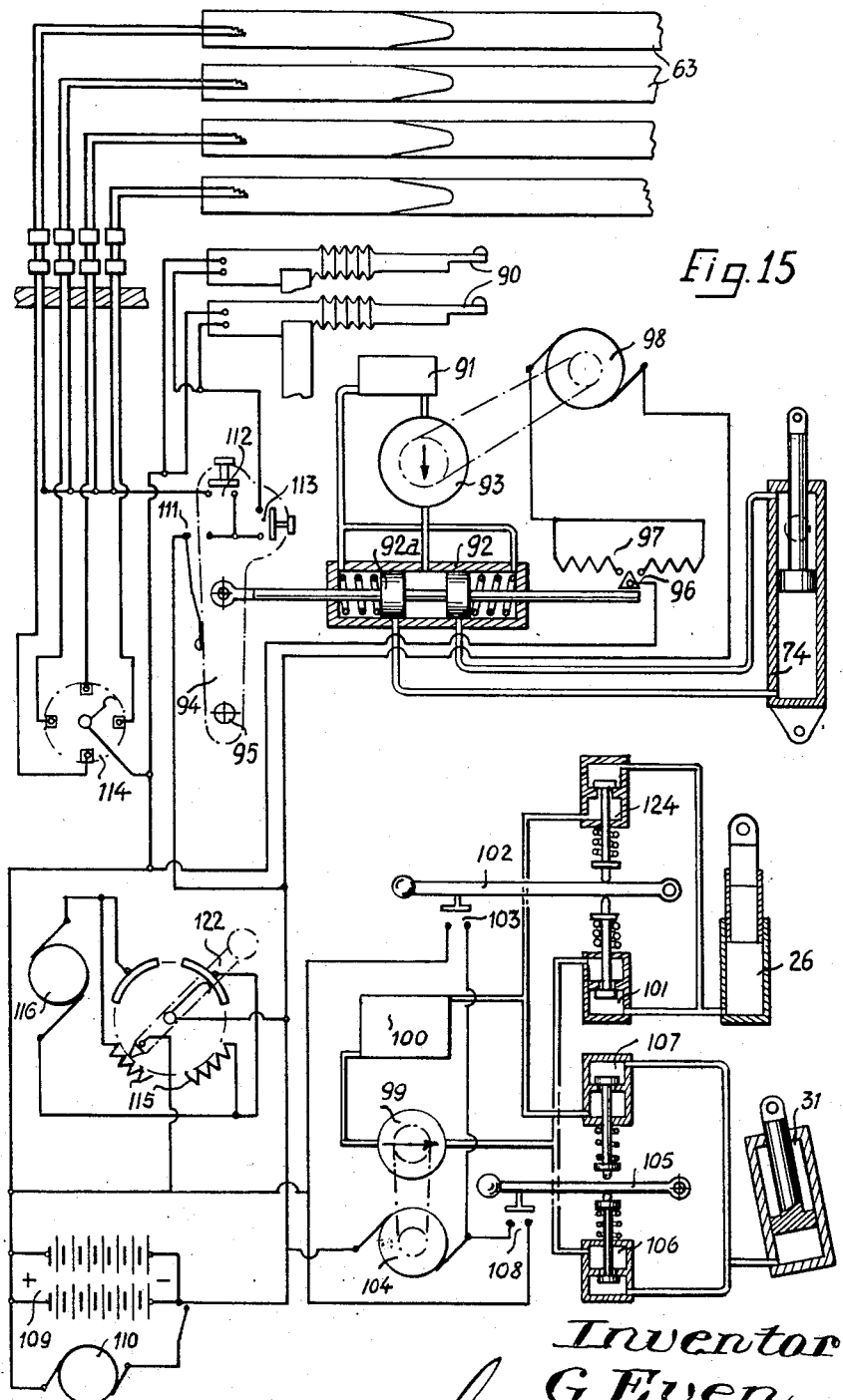

United States Patent Office 3,024,704
Patented Mar. 13, 1962

3,024,704
ARMOURED TANK
Georges Even, 3 Blvd. Victor, Paris, France
Filed May 13, 1957, Ser. No. 658,605
Claims priority, application France Aug. 13, 1951
4 Claims. (Cl. 89—36)

My invention relates to a diminutive, compact, tank vehicle which is adapted to be operated by two men, viz., a driver and a gun-firer.

This invention is a continuation-in-part of my prior application filed August 13, 1952, for "Light Tank With Entirely External Gun Machinery" under Serial No. 304,079, now abandoned.

In such tanks, the top wall of the tank body is provided with a main opening on the edge of which is rollingly supported a turret, and with a second opening, smaller than the first one and normally covered by an overhead protecting hood, which latter is provided with at least one observation aperture for the driver.

Said second opening shall be so located with respect to the turret, as to permit reduction of the tank body to the minimum possible size while offering to the driver the maximum possible field of vision.

Now, if the second opening is located in front of the turret the length of the tank becomes prohibitive. On the other hand, if the second opening is disposed on one side of the turret the field of vision of the driver becomes limited on one side by the presence of the turret.

An object of my present invention is therefore to provide a diminutive tank of the type described, wherein the second opening is obliquely offset with respect to the turret, so as to increase the field of vision of the driver, as compared with the side-by-side arrangement, while reducing the length of the tank body, as compared with the "in-front" disposition.

Now the applicant has observed that, if the second opening is disposed farther forward than the foremost point of the edge of the main opening, the length of the tank body rapidly increases without materially improving the driver's field of vision while, if the said second opening is disposed farther rearward than the center of the main opening, the field of vision of the driver rapidly narrows without any substantial reduction of the length of the said tank body.

It is therefore a further object of the invention to provide a diminutive tank of the type described, wherein the second opening is located within a zone comprised between the edge of the main opening and one of the longitudinal edges of the body top wall, the said zone being furthermore limited, at its front end, by a vertical transverse plane substantially tangential to the edge of the main opening and, at its rear end, by a vertical transverse plane containing the center of the said main opening.

Still another object of the invention is to provide novel mounting means for the turret-supporting edge of the main opening so as to relieve the said edge of flexure and torsion stresses resulting from deformations of the tank body.

Another object of my invention is to provide a tank of the type described, the turret of which carries entirely external weapons, such as bazookas, non-recoiling guns, etc., adapted to be loaded from inside the tank body through the above-mentioned second opening.

Other objects and advantages of the invention will be hereinafter described with reference to the accompanying drawings, given merely by way of example.

In these drawings:

FIG. 5 is a longitudinal sectional view along line 5—5 of FIG. 9 of a tank according to the invention provided with entirely external weapons.

FIG. 6 is a longitudinal sectional view showing the manner in which ammunition is loaded in the tubes of the tank of FIG. 5.

FIG. 7 is a detail cross-sectional view of the cover protecting the driver and provided with a safety opening device.

FIG. 8 is a detail from FIG. 7.

FIG. 9 is a front view of the tank of FIG. 5.

FIG. 10 is an exploded perspective view of the tank body and the cupola.

FIG. 11 is an enlarged perspective view of the weapon support.

FIG. 12 is a cross section along line 12—12 of FIG. 11.

FIG. 13 is a general side view of the tank shown in FIGS. 5 and 9.

FIG. 14 is a comparative view showing the size of a tank according to the invention with respect to two known tanks of big type.

FIG. 15 is a diagram of the controls, and

FIG. 16 is a longitudinal section of the rear end of a rocket-guiding tube provided with means to protect the occupants of the tank, shown in FIG. 5, during firing.

Figure 1:
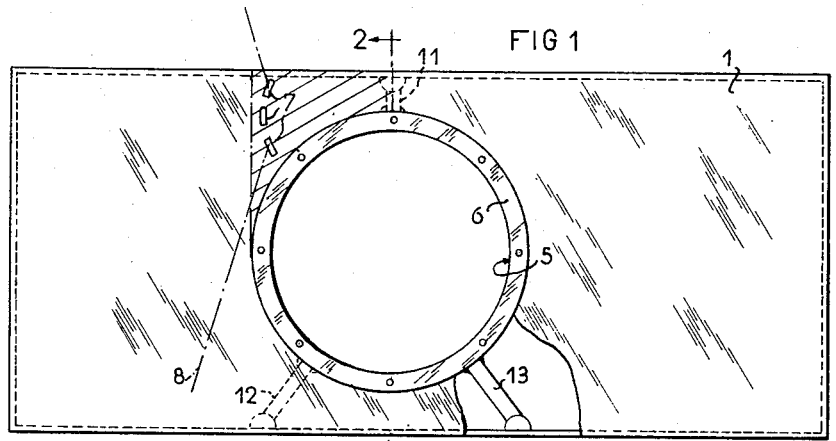
FIG. 1 is a diagrammatic plane view of an armoured tank body according to the invention, with a turret having its center on the axis of the vehicle, and provided with multiple observation openings.
Figure 2:
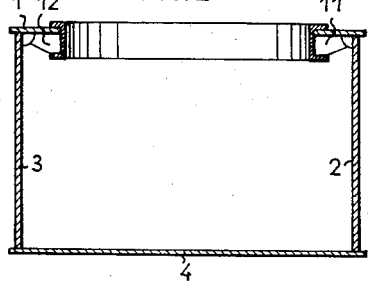
FIG. 2 is a vertical sectional view along line 2—2 of FIG. 1.

In the embodiment shown in FIGS. 1 and 2, the armoured tank body comprises a top wall 1, two side walls 2 and 3, and a bottom wall 4. The top wall 1 is provided with a wide circular opening 5, the edge of which is reinforced by a ring 6 having a U-shaped cross-section, and which is intended to support a rolling track for a turret (not shown), adapted to cover the opening 5 and carrying one or more weapons.

The gun-firer, who is one of the two members of the tank crew, will sit under this turret while the driver, for observing his path, disposes of openings 7 (three in the example shown). These openings are located in the top wall of the tank within a well-defined zone (shaded in FIG. 1), comprised between the edge of the central opening 5 and one of the longitudinal edges of the vehicle, the said zone being furthermore limited, at its front end, by a vertical transverse plane substantially tangential to the edge of the opening 5 and, at its rear end, by a vertical transverse plane substantially passing through the center of the said opening. Owing to this arrangement, it may be seen that the field of vision of the driver is not impaired by the turret, as shown by the oblique visual ray 8. Moreover, it is obvious that the visibility in front of the tank and towards its other side, does not meet any obstacle and may even extend rearwardly within certain limits. The angle of vision of the driver is thus finally at least equal to 180°.

On the other hand, the rolling track on the ring 6 should remain always perfectly flat to ensure suitable rolling of the turret. It is therefore indispensable to protect the said rolling track against the influence of the deformations of the tank body and more particularly those of its top wall 1. This is the reason why, in the embodiment shown in FIGS. 1 and 2, the said ring, not only offers a high rigidness of its own, but is moreover supported also very rigidly, on the upper edges of three gussets 11, 12 and 13 welded on the internal faces of the side walls 2 and 3 of the vehicle at three points suitably spaced along the circumference of the opening 5. In these conditions, the said three points determine a plane in which the ring is continuously maintained so that it is not subjected to deformations of the vehicle body walls and in particular to the deformations of the top wall 1.

Figure 4:
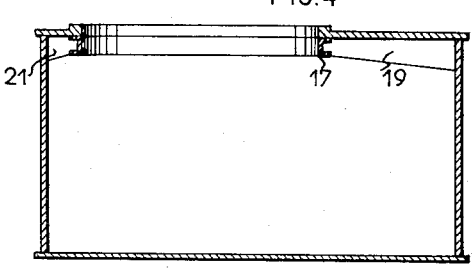
FIG. 4 is a sectional view along line 4—4 of FIG. 3.
Figure 3:
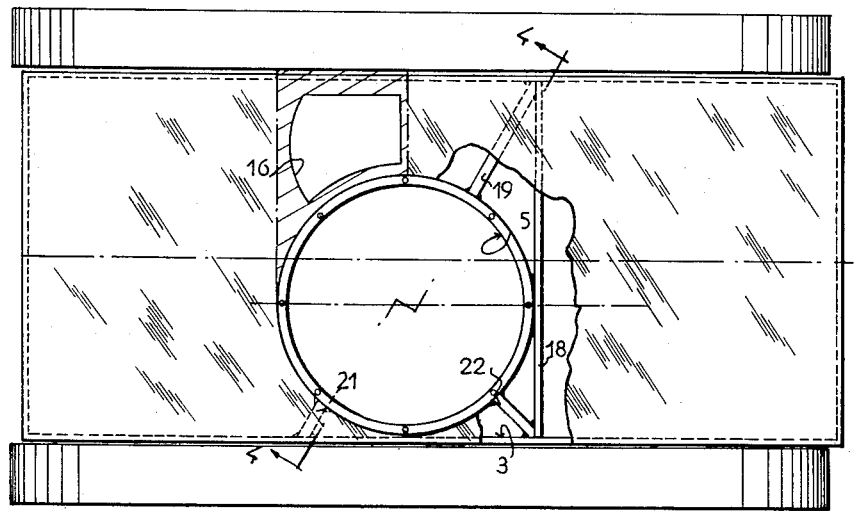
FIG. 3 is a view similar to that of FIG. 1, of an altertive embodiment in which the turret is slightly offset with respect to the axis of the vehicle.

In the alternative embodiment shown in FIGS. 3 and 4, the opening 5 to be covered by the turret is slightly offset towards the left side of the vehicle. In this modification, the observation required to drive the vehicle is ensured by one single opening 16, located as previously, in the above-defined zone (shaded in the drawing). The natural rigidness of the ring 17 is smaller than that of the ring 5 of FIGS. 1 and 2. In order that the said ring nevertheless remains in a rigid plane in spite of the deformations of the vehicle body, the said ring is made rigid with the upper edges of two right-angled vertical walls, one of which is constituted by a transverse web 18 while the other one, in the example shown, is merely constituted by the side wall 3 of the vehicle body itself. The ring 17 is furthermore reinforced as best as possible along its periphery, e.g., by means of vertical gussets 19, 21, 22 (FIGS. 3 and 4), rigid with the upper portion of the walls 18 and 3.

In the embodiment shown in FIGS. 5 to 13, the tank according to my invention is essentially constituted by a closed flat and elongated body which is particularly clearly shown in the exploded view of FIG. 10 and by entirely external weapon support in the enlarged view of FIG. 11, hinged on a turret which is, in turn, rotatively mounted on said body.

As shown in FIG. 10, the tank body comprises in this example two lateral thick elongated plates 2a and 3a welded at both ends to armoured curved plates 203 and 204 and along their longitudinal edges, to a bottom plate 4a and to a top assembly comprising a front plate 206, a slightly embossed central plate 207 and a rear plate 1a. The front and rear top plates 206 and 1a are weakly inclined with respect to horizontal so as to offer small incidence to enemy projectiles. Plates 206 and 207 are assembled in such a manner as to provide therebetween an access aperture 209 for the driver. The embossing 207 is provided with a circular opening 5, the edge 211 of which is to receive rolling means, such as balls 212, for a turret constituted by three elements 213, 214 and 215, as shown in FIG. 10.

The element 213 is rotatively mounted on the edge 211, as described above, and is provided with apertures 218 for a machine-gun or the like 219 for episcopes 220 for the jack controlling the weapon support, as described hereunder, and 220a for the gun-sight. The element 214 is hinged, as shown at 217, on the element 213, to constitute a tiltable hood for protecting the access opening 221 provided in the element 213 to accommodate the head of the gun-firer. The third element 215 of the turret is constituted by a cap provided with an aperture 222 for a retractable periscope permitting the gun-firer a general view in all directions.

A third access aperture is provided at the rear end of the top plate 1, said aperture, designed for inspection, repairs, etc., of the engine, being normally closed by a hinged cover or the like, as shown at 23.

Finally, man holes such as 24, having tight covers 24a may be optionally provided, as shown in FIG. 10, in the side plates 2—3 of the tank body.

The front plate 206 is provided with slides 48 in which panels 52 and 53 intended to cover the driver and the ammunition compartment are slidably engaged through rolling means, such as balls 54, as shown in FIG. 7.

To avoid gripping of the panels due to deformation, a safety opening device is provided. In the example shown in FIG. 7, the panels have been made of two parts hinged, as shown at 63, either above or under the panel, and normally held in alignment by means of a lever 56 pivoted at 57 on one part of each panel and engaged, as shown at 61, under the other part thereof; a plurality of such locking devices may be provided, a linkage being articulated as at 62 at one end of each lock and the whole locking assembly being controlled by a handle 58 which is used, at the same time, for operating the panel. Balls 54 are embedded in circular notches 55, as shown in FIG. 8 and held in said notches by means of suitable holding members, so that they cannot escape when panels 52, 53 are folded about hinges 63. As shown in FIG. 5, a periscope 59 emerges through the protecting panel of the driver 29 to permit the same an outside view in fighting position.

As shown in FIG. 5, the seat 37 of the gun-firer 38 is mounted on the piston 26 of a telescopic, preferably hydraulic, jack, said piston being capable both of rotating and sliding in the cylinder 27 of said jack. A plurality of telescopic piston elements are preferably used to reduce the overall height of the jack.

This arrangement permits the gun-firer to rotate or to raise and lower its seat at will.

The seat 28 of the driver 29 is supported on the piston rod 30 of another jack 31, which permits the driver, by acting upon conventional control means, not shown, to take either the fighting position shown in FIG. 5, in which he is completely protected inside the flat body of the tank, or the position of FIG. 6, in which he can load the tubes, or again, a position in which a part of his body is emerging above the top surface of the tank body, through the access aperture 209, his protecting panel being open, for instance to drive on a road in non-fighting conditions.

33 and 34 are the normal driving controls of the tank, while 33a and 34a are duplicated driving controls which may be used by the gun-firer 38, for instance in reverse drive, or again, if the driver 29 is wounded, etc.

It must be well understood that the duplicated controls 33a, 34a which have been shown located at the rear of the tank, could be also arranged in the front portion thereof.

Said duplicated drive controls are particularly used, when, after having fired his gun, the gun-firer wants to retreat without having time or possibility to turn the tank in the usual way.

It is particularly contemplated for this reason, to equip the engine with any conventional reversing gear allowing said engine to drive the tank at the same speed as in forward drive.

In the rear portion of the tank body is mounted the engine 42 of the tank (FIG. 13), as well as the fuel container, accumulators, and so on. This portion is separated from the front portion by means of a heat insulating partition 43 provided with an opening 44 having a flap 45 for air-conditioning. At a suitable distance from partition 43 is arranged a fan 46 intended for cooling the engine and creating an air circulation in the whole tank body. Said fan communicates with atmosphere through air outlets (not shown). Engine 42 drives tracks 49 carried on rollers 50 through any suitable conventional transmission means.

The assembly, so far described, constitutes, when the panels 52—53, the flap 23 and the hood 214—215 are closed, an entirely enclosed and extremely flat body in which the driver 29, the gun-firer 38, the power unit 42 and the ammunition are perfectly protected.

As already mentioned in the preamble, this flat armoured body is used for carrying a battery of weapons, such as non-recoiling guns, flame-projectors, machine-guns, machine-pistols, or any suitable tank and/or foot-soldier fighting weapons.

In the example shown in FIGS. 11 and 12, the battery of weapons comprises six rocket-tubes, such as 63, each of which is housed in a semi-cylindrical groove, such as 64, holding cross-members 65 provided with semi-circular notches 66 cooperating with grooves 64 being provided to removably secure the rocket tubes 63 under a thick frame 67 hinged, e.g., by means of stirrup members 68 on the lowermost element 213 of the turret, on hinges 69, about an axis 70 parallel to the edge plane of the turret. A cutoff portion 71 having, in the example shown, the shape of a U is provided in frame 67, to permit the latter to be lowered by a rotation about the axis 70 in spite of the presence of the turret. Auxiliary firing apparatus, such as light, or infra-red projectors, automatic elevation wind correctors or the like may be provided, as shown at 72.

A linkage constituting an articulated parallelogram is provided to interconnect the sight 73 and frame 67, adjusting means, such as a micrometric screw 74a being interposed in one element of said linkage to permit an accurate adjustment of the parallelism between the optical axis of sight 73 and the axes of the rocket tubes 63. The elevation of the rocket-tubes is adjusted from inside the tank body through a hydraulic jack 74 articulated by means of pins 75 on the lowermost element 213 of the turret, as shown at 76.

The rotation of the turret is obtained by means of a circular rack 77 which is driven from a pinion 78 operated by means of a small electric reducing meter 79, the action of which may be substituted for, if required, by a hand-controlled gear 80 operated by means of a crank-handle 81 and provided with a suitable clutch (not shown). U-shaped holding members 84 are provided to prevent the gun machinery and turret from escaping, the same arrangement being adopted between the cap 215 and the hood 214. These U-shaped holding members constitute the only removable assembling means between the body of the tank and the assembly of the two other main elements which permits to manufacture and, if required, to transport separately said elements.

As mentioned in the preamble, the ammunition such as rocket 86 is housed beside the driver 29, e.g., in cylindrical casings 85.

As shown in FIG. 13, the tank is provided with an antenna 87 adapted to be folded by means of a cable 88.

To conceal the front openings of tubes 63 (FIG. 5) from enemy observation and thus avoid enemy shooting inside tubes 63, I contemplate to adapt on the front end of the tubes caps 89 pivoted at the end of the tube and urged by light springs 89a towards the closing position; such caps are brought out of the way when firing the guns by the pressure of gases inside the tubes.

FIG. 15 shows a hydraulic and electric wiring diagram for a tank according to my invention, this view showing, in particular, a way of controlling weapons of different kinds equipping my tank.

In the example shown in FIG. 15, the weapons carried by the hinged frame comprise four rocket tubes 63 and two electric machine guns 90. The other parts to be controlled are: the elevation control jack 74, the gun-firer seat control jack 26 and the driver seat control jack 31.

In the example shown, the three jacks 74, 26 and 31 are hydraulically controlled. It is to be understood that they could be also controlled electrically, mechanically or manually.

The hydraulic control system of jack 74 comprises a pump 93 for feeding jack 74, which is of the double-acting type, through a distributor 92, the sliding member 92a of which is actuated from a hand-control lever 94, pivoted at 95. The sliding member 92a controls in turn the movable arm 96 of a rheostat 97 adjusting the speed of a direct-current electric motor 98 driving pump 93.

The hydraulic control system of the gun-firer seat jack 26 comprises a pump 99 adapted to feed jack 26 from a tank 100, through a valve 101, to raise the simple-acting telescopic jack. Valve 101 is opened by means of a hand-lever 102, which simultaneously closes a contact 103 to complete the energizing circuit of a motor 104 actuating pump 99. The lowering of jack 26 is ensured, under the action of the weight of the gun-firer and his seat, and under the control of a valve 124 which is interposed in the return duct from jack 26 to tank 100. The opening of valve 124 is ensured by hand-lever 102. When said hand-lever is in neutral position, both valves 101 and 124 are closed, so that jack 26 remains stationary.

The control system of jack 31 is similar to that of jack 26 and is ensured by a hand-lever 105 controlling an intake valve 106, an exhaust valve 107 and a contact 108 controlling motor 104.

In the example shown, both jacks 26 and 31 are fed in parallel, but it is obvious that they could be also fed separately from independent pressure fluid source.

In the example shown, the fire control of weapons 63 and 90 is ensured through a safety contact 111 from an electric B battery 109, loaded from a dynamo 110 and also feeding motors 98 and 104. 112 is a contact for starting the electric machine-guns 90.

In the example shown, all these contacts have been arranged on the lever control ensuring the elevation adjustment of the weapons, so that the gun firer can manipulate all necessary controls with one hand. 114 is an automatic device for ensuring the automatic successive firing of the four rockets.

The hand-lever 122 controls the rotation of the turret through a rheostat 115 adjusting the speed and way of rotation of an electric motor 116.

The above-described controls permit establishing an operative connection between the entirely enclosed flat body of the tank and the entirely external weapon unit, as well as controlling all movable elements of the tank.

To protect the occupants of the tank from the gases escaping from the rear end of the tubes 63 and, at the same time, to increase the initial speed and range of the rockets, when the same are fired with a small angle of elevation, I have provided useful and new means which are shown in FIG. 16 and particularly described with reference to said figure.

The rear part of the rocket tube 63 is shown in this figure. On the rear end of said tube is hinged, at 118, a breech 119. Said breech can be tilted in the direction of the arrow 120 to permit the introduction of the rocket and can be maintained in the firing position shown by any convenient means, not shown. Breech 119 is provided with calibrated exhaust ducts 121 so designed that the gases escaping through said ducts are conducted in a direction avoiding the occupants, and in particular the driver of the tank, to be incommodated by the heat, while increasing the initial pressure of the gases urging the rocket in the forward direction.

What is claimed is:

1. In an armoured tank, a hollow body having a top wall and a turret mounted thereon for rotation about a vertical axis, at least one gun barrel supported by said turret entirely externally thereof in such a manner that the rear end of said barrel is adjacent the edge of said turret so that rotation of said turret moves the rear end of said barrel along a circular path concentric to said vertical axis, said top wall being provided with an opening beyond the edge of said turret and spaced from said axis by a distance substantially equal to the radius of the circle described by the rear end of said barrel whereby upon rotation of said turret relative to said body, said rear end of said barrel may be brought into position for loading said barrel through said opening from within said body when said rear end of the barrel is positioned above said opening.

2. A tank according to claim 1, in which means are provided to tilt said gun barrel about a horizontal axis to different firing angles.

3. A tank according to claim 1, in which said vertical axis and the axis of said opening are disposed one on each side of the longitudinal plane of symmetry of said body.

4. In an armoured tank, a hollow body having a top wall and a turret mounted thereon for rotation about a vertical axis, a U-shaped support member having its leg portions extending at two opposite sides of said turret above said top wall in generally parallel relation thereto and its base portion hinged to the outer wall of said turret at a point intermediate said two sides, at least two gun barrels each secured on one of said leg portions, respectively, in generally parallel relation thereto, means to tilt said support to different elevation angles, whereby said gun barrels are capable of being moved both for rotation about said vertical axis and for elevation to different firing angles, and an opening in said top wall spaced from said vertical axis by distance substantially equal to the radius of the circle described by the rear end of the barrels upon a full rotation of said turret, said opening permitting loading from within said body of either barrel having its rear end brought near said opening.

References Cited in the file of this patent

UNITED STATES PATENTS

| | | |
|---|---|---|
| 1,002,169 | McSweeney | Aug. 29, 1911 |
| 1,136,605 | Lobato | Apr. 20, 1915 |
| 2,175,852 | Perkins | Oct. 10, 1939 |
| 2,358,257 | Schwab | Sept. 12, 1944 |
| 2,361,129 | Sheehan et al. | Oct. 24, 1944 |
| 2,460,321 | Walker | Feb. 1, 1949 |
| 2,690,700 | Turner | Oct. 5, 1954 |

OTHER REFERENCES

Popular Science, October 1944, pages 80 to 81.